April 9, 1940. H. R. GRAYBILL 2,196,862
ANIMAL TRAP
Filed March 15, 1939 2 Sheets-Sheet 1

INVENTOR
Hershey Roy Graybill
BY
Louis Prevost Whitaker
ATTORNEY

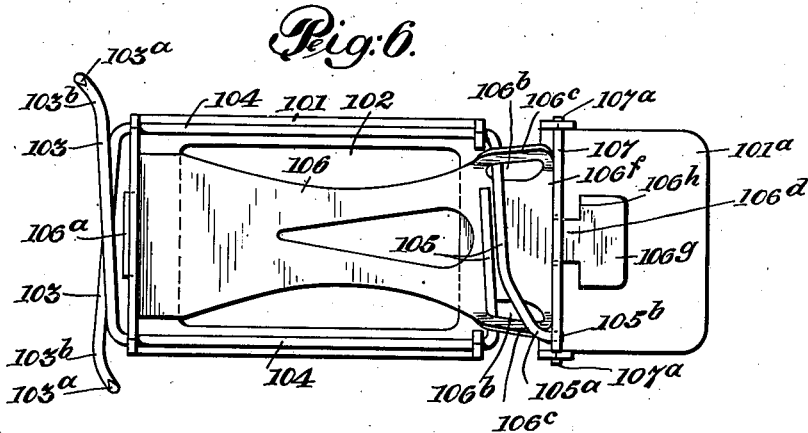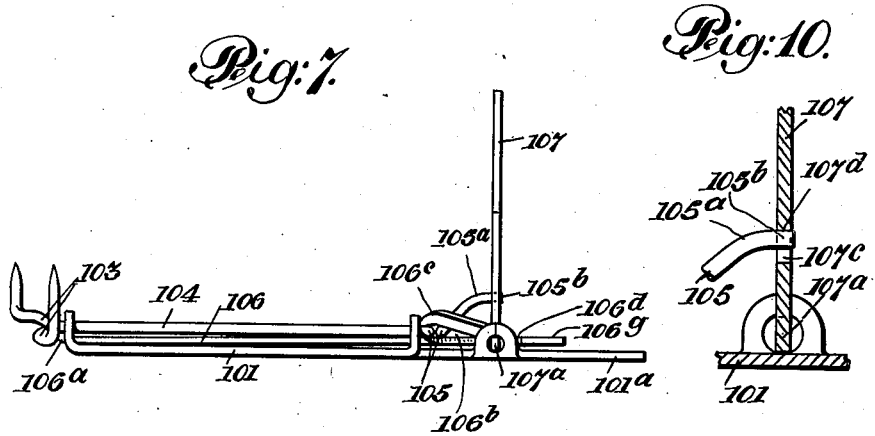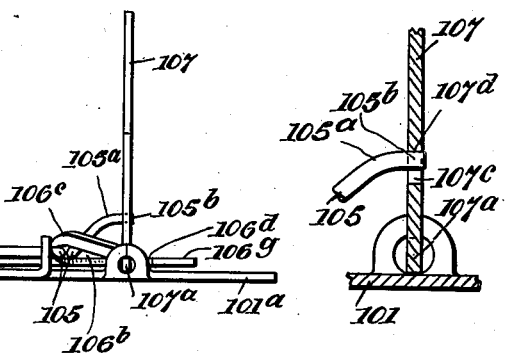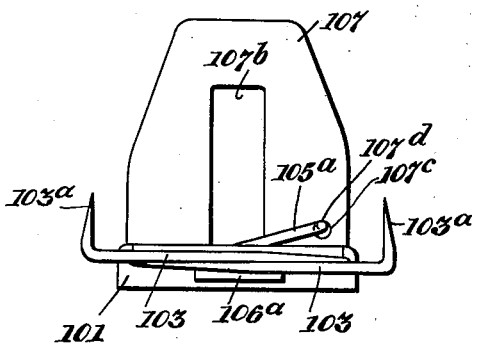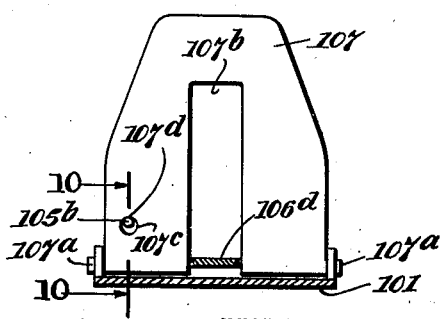

Patented Apr. 9, 1940

2,196,862

UNITED STATES PATENT OFFICE 2,196,862

ANIMAL TRAP

Hershey Roy Graybill, Manheim, Pa., assignor to Animal Trap Company of America, Lititz, Pa., a corporation of Pennsylvania Application March 15, 1939, Serial No. 261,862

15 Claims. (Cl. 43—91)

My invention consists in the novel features hereinafter described, reference being had to the accompanying drawings, which illustrate two embodiments of the same, selected by me for purposes of illustration, and the said invention is fully disclosed in the following description and claims.

The object of my invention is to provide a cheap and effective animal trap intended particularly as a gopher trap, which can be quickly and easily set by one hand, and without danger to the operator. Traps of this character are intended to be placed in the runways of the animal, and are provided with a pair of oppositely disposed, transversely movable, pivoted impaling jaws, between which the animal passes and encounters a vertically disposed tripping plate which extends transversely of the runway and is tripped by the animal or by freshly excavated soil which the animal pushes ahead of him. The tripping plate must therefore be located at such a distance from the jaws so that when the trap is tripped, the jaws will of necessity strike the body of the animal.

In carrying out my invention, I provide the trap with a pair of longitudinally extending shafts, each carrying at its forward end one of the impaling jaws, and at its rear end a setting arm in combination with a flat spring having portions for engaging the setting arms for moving both jaws simultaneously into setting position, when the spring is moved in one direction, and for forcing the jaws into engagement with the animal, when the spring is released, and a pivoted tripping plate for locking the jaws, and the spring in set position.

In the preferred forms in which I have contemplated embodying my invention, the spring is provided with a finger piece projecting through an aperture in the tripping plate, to the rear side thereof, to facilitate the setting of the trap with one hand by merely depressing the finger piece with the thumb, and locking the parts in set position by slightly tilting the tripping plate, in a direction toward the jaws, i. e., toward the forward end of the trap, a movement of the plate in the opposite direction by the animal serving to release the trap and secure the animal. In order to lock the jaws in set position, the tripping plate may be made to engage with a setting arm, or arms, or with the spring, as preferred and as hereinafter described.

Referring to the accompanying drawings:

Fig. 6 is a plan view similar to Fig. 1, showing a slight modification of my invention.

Fig. 7 is a side elevation of the trap shown in Fig. 6.

Fig. 8 is a front end view of the trap shown in Figs. 6 and 7.

Fig. 9 is a transverse sectional view of the said trap.

Fig. 10 is a detailed sectional view on the line 10—10 of Fig. 9.

Figure 1:
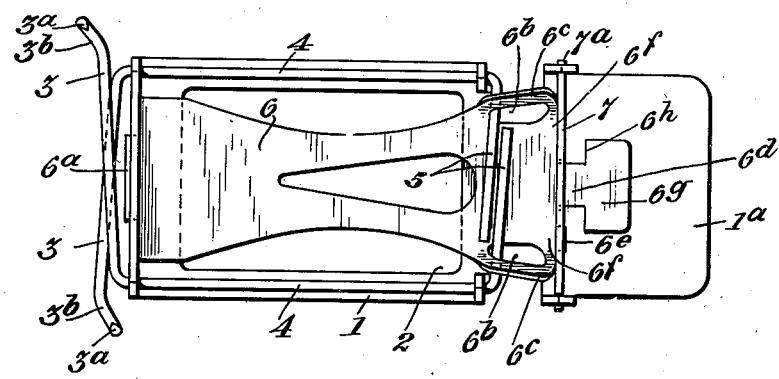
Fig. 1 is a plan view of one embodiment of my invention showing the trap in set position.
Figures 2, 5:
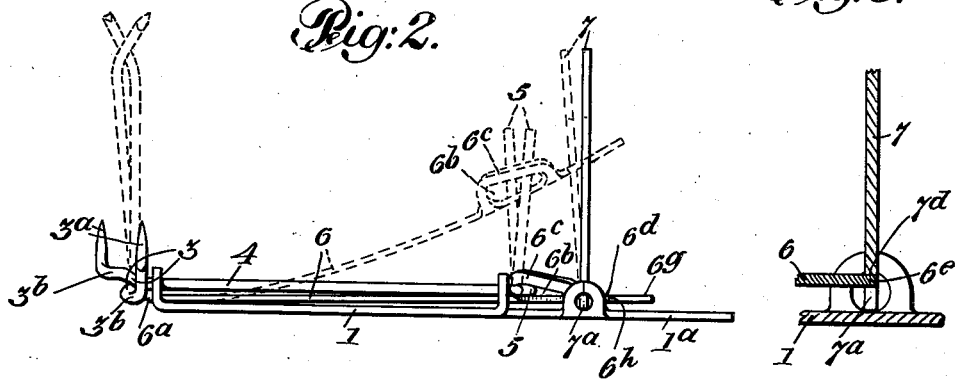
Fig. 2 is a side elevation of the same, the positions of the parts in released position being indicated in dotted lines.
Fig. 5 is a detailed sectional view on the line 5—5 of Fig. 4.

Referring to the embodiment of my invention illustrated in Figs. 1 to 5 inclusive, 1 represents a suitable base, which is preferably formed of metal, and provided with an enlarged aperture 2 in its forward portion. The base may be made of sheet metal as shown in the drawings, but obviously it could be made of metal strip material, or cast metal, if desired.

At the forward end of the base, I provide a pair of opposed impaling jaws, indicated at 3—3, each of which is provided with an angular impaling point, as indicated at 3a, 3a. Each of said jaws is operatively connected with a longitudinal pivot shaft 4, located adjacent to one side of the base, and extending longitudinally thereof, and pivotally mounted with respect to the base, in any desired way, each of said shafts being provided at its rear end with a setting arm 5. I find it convenient to form each of the shafts 4, integrally with one of said jaws 3, and its setting arm 5, as shown, using stout wire or rod stock for the purpose. Each of the jaws 3 is adapted to be swung from the released position, indicated in dotted lines in Fig. 3, in a direction toward the opposite side of the base into set position, as indicated in full lines in Fig. 3, in which position the impaling points 3a, 3a, will extend substantially vertically, so that on the release of the trap these jaws will rise toward each other and embrace the body of the animal between them. Each of the jaws is slightly off-set, as indicated at 3b, so that in the released position, the jaws will interlock, as indicated in dotted lines in Figs. 2, 3, thus forming a stop to limit the movement of the jaws.

6 represents a flat spring for actuating the jaws, which is secured to the base at its forward end, conveniently by providing the spring with a projection 6a, extending through an aperture in the forward end of the base. The rear or movable portion of the spring engages the setting arms in such manner that as the spring is depressed, it will depress the setting arms and jaws which are permitted to assume horizontal positions, the spring being locked in set position, as hereinafter described, and the construction being such that when the spring is released, it will act upon the setting arms 5, raising them and causing the jaws to come together into the positions illustrated in dotted lines in Figs. 2 and 3. I prefer to connect the spring 6, with the setting arms 5, 5, in such manner that the setting arms and jaws will be positively actuated in both directions, that is to say, in setting the trap as well as in bringing the jaws together on the release of the spring. This is conveniently accomplished as shown in the drawings by providing the spring with apertures as indicated at 6b, loosely engaged by the setting arms 5, 5. I also find it convenient to form these apertures in laterally extending portions or wings, 6c, adjacent to the rear end of the spring, which are bent upwardly so as to accommodate the various inclined positions of the setting arms in passing from the released position to the horizontal set position, and vice versa.

Figures 3, 4:
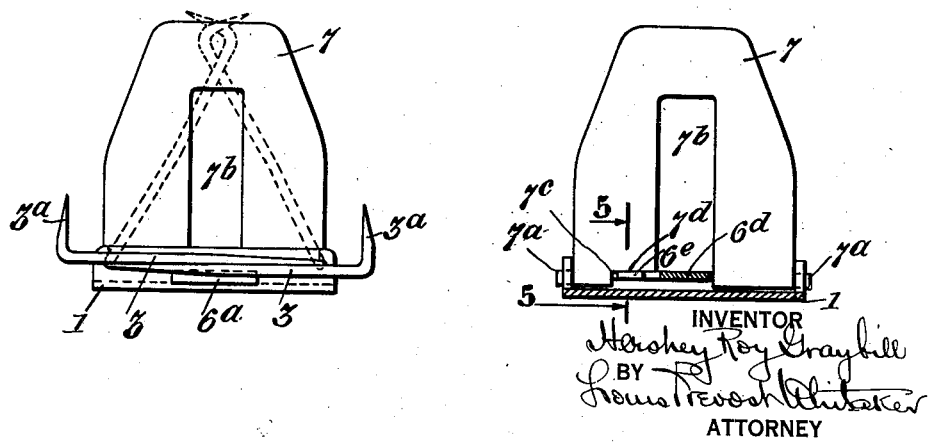
Fig. 3 is a front end view of the trap in set position, the released position of the jaws being indicated in dotted lines.
Fig. 4 is a transverse sectional view of the trap showing the engagement of the tripping plate with a trigger on the spring.

In order to set the trap, it is necessary to provide means for locking the spring 6 in set or depressed position. This can be accomplished in a number of ways. In Figs. 1 to 5 I have shown a tripping plate indicated at 7, which is pivotally supported at its lower end with respect to the base, as indicated at 7a, 7a. The tripping plate is provided with a central aperture 7b, through which a narrowed portion 6d of the spring extends, the rear end 6g of the spring, which is wider than said narrowed portion, forming a thumb engaging portion by means of which the spring can be readily depressed to set the trap. The tilting movement of the tripping plate on its pivotal connections 7a is limited by shoulders 6f and 6h respectively located at the forward and rear ends of the narrowed portion 6d. The spring in this instance is shown provided with a locking projection 6e, which is adapted to extend into a recess 7c, opening laterally from the central recess 7b, as best seen in Fig. 4, and engages the upper edge 7d of said recess, which forms a locking shoulder.

The base 1, preferably has a portion 1a extending rearwardly of the tripping plate.

To set the trap, it is only necessary to depress the rear end of the spring 6 and secure it in set position. This, in the embodiment shown in Figs. 1 to 5 inclusive, is very readily accomplished by placing the fingers of the right hand beneath the rear portion 1a, of the base, with the thumb on the spring extension 6d and depressing the spring until the locking projection 6e of the spring is brought into position below the shoulder 7d of the tripping plate, when by inclining the trap to the left, the plate will spring over and bring the shoulder 7d into engagement with the projection 6e of the spring.

The trap is then ready to be placed in the runway frequented by the animal, longitudinally of the runway, in such position that as the animal moves toward the tripping plate now held in substantially vertical position by its engagement with the spring, the head of the animal, or portions of soil pushed forward by the animal, will encounter the tripping plate and push it rearwardly, thus releasing the spring and causing the impaling jaws to strike the body of the animal from opposite sides. In view of the fact that the animal frequently pushes a certain amount of soil before it in traversing the runway, it is desirable to have the tripping plate located at such a distance from the jaws as to insure that the jaws will strike the body of the animal. It is also desirable to have the main body of the base provided with a large central aperture, as indicated at 2, for example, beneath the spring, so as to prevent the accumulation of dirt and so forth, beneath the spring, which would interfere with the proper setting of the trap.

In Figs. 6 to 10 inclusive, in which the parts corresponding with those previously described are given the same reference characters with the addition of 100, I have shown a slightly modified form of locking means for securing the spring and jaws in set position. In this instance, I have shown one of the setting arms 105 provided with an extension, indicated at 105a, terminating in a rearwardly extending locking projection 105b, which is adapted to engage an aperture 107c in the tripping plate 107, the upper edge 107d of which constitutes a locking shoulder. Otherwise, the trap is constructed in the same manner as previously described. The operation as to setting and releasing the trap is substantially the same as previously described, except that in setting the trap the thumb piece 106d, is depressed until the locking projection 105b on one of the setting arms, comes into alignment with the aperture 107c, in the plate 107, when the trap is tilted, so as to permit the projection 105b to enter the aperture 107c, and engage the locking shoulder 107d. Obviously, the rearward movement of the tripping plate 107, by the forward progress of the animal will release the trap and permit the spring to rise and actuate the jaws 103, in the manner previously described.

It will be noted that in both forms of my improved trap, the opening of the spring actuated jaws, and setting the locking means therefor, is accomplished by one hand without touching the jaws or placing the operator's hand in a position where it could be caught or injured by the accidental release of the jaws. It will also be seen that when an animal is caught in the trap, the jaws can be opened by one hand, leaving the other free to remove the animal.

It will also be noted that in the form of trap shown in Figs. 6 to 9, in which the spring is held in set position indirectly, by the engagement of the tripping plate with one of the setting arms which in turn engages the spring at a point adjacent to the pivot shaft of the setting arm, this construction providing a long leverage on the part of the setting arm for holding the spring depressed, and the upward pressure of the setting arm on the tripping plate in set position is materially less than where the spring directly engaged the tripping plate as in the form illustrated in Figs. 1 to 5. It follows therefore that the form of trap shown in Figs. 6 to 9 provides a very sensitive release as obviously there is much less frictional resistance between the locking parts, to be overcome than in the form shown in Figs. 1 to 5.

What I claim and desire to secure by Letters Patent is:

1. In an animal trap the combination with a base, a pair of opposed jaws pivotally mounted thereon, each provided with a setting arm at a distance from said jaws, a spring having a vertically movable part for engaging said setting arms to close said jaws upon the animal, and a tripping plate pivotally connected with the base and provided with locking means for holding said vertically movable part, and said setting arms and jaws in set position.

2. In an animal trap, the combination of a base, a pair of opposed jaws pivotally mounted thereon, each provided with a setting arm at a distance from said jaws, a flat spring secured to said base and having a vertically movable part engaging said setting arms, and a vertically disposed tripping plate pivotally connected with said base and provided with locking means for holding said movable part of the spring and said setting arms and jaws in set position.

3. In an animal trap, the combination of a base, a pair of opposed, transversely movable jaws, each provided with a longitudinal pivot shaft having a setting arm at a distance from the connected jaw, a flat spring secured to said base adjacent to said jaws, and having a vertically movable portion extending beneath said setting arms, in the set position of the trap, and a vertically disposed tripping plate pivotally connected adjacent to its lower end to said base, and provided with locking means for holding said setting arms and jaws and the vertically movable portion of the spring in set position.

4. In an animal trap, the combination of a base, a pair of opposed, transversely movable jaws, each provided with a longitudinal pivot shaft having a setting arm at a distance from the connected jaw, a flat spring secured to said base and having a vertically movable portion extending beneath said setting arms in the set position of the trap and a vertically disposed tripping plate pivotally connected with said base and provided with a vertically disposed aperture, and with locking means for holding said spring and setting arms and jaws in set position, said spring having a portion projecting through said aperture in said plate and forming a thumb engaging portion for depressing the spring into set position.

5. In an animal trap, the combination of a base, a pair of opposed, transversely movable jaws, each provided with a longitudinal pivot shaft having a setting arm at a distance from the connected jaw, a flat spring secured to said base and having a vertically movable portion engaging said setting arms, and a tripping plate pivotally connected with the base and having a locking shoulder for engaging a part connected with said spring for holding it in set position.

6. In an animal trap, the combination of a base, a pair of opposed, transversely movable jaws, each provided with a longitudinal pivot shaft having a setting arm at a distance from the connected jaw, a flat spring secured to said base and having a vertically movable portion engaging said setting arms, and a tripping plate pivotally connected with the base and having a locking shoulder for engaging a part connected with said spring for holding it in set position, said tripping plate having an aperture therein, and said spring having a portion extending through said aperture and projecting in rear of said plate to form a thumb piece for depressing the spring into set position.

7. In an animal trap, the combination of a base, a pair of opposed, transversely movable jaws, each provided with a longitudinal pivot shaft having a setting arm at a distance from the connected jaw, a flat spring secured to said base and having a vertically movable portion engaging said setting arms, and a vertically disposed tripping plate pivotally connected at its lower end to the base, and having locking means for holding said spring and setting arms in set position, said spring having portions for engaging the plate, in the released position of the trap for limiting its movement on its pivotal connection with the base in both directions.

8. In an animal trap, the combination of a base, a pair of opposed, transversely movable jaws, each provided with a longitudinal pivot shaft haveing a setting arm at a distance from the connected jaw, a flat spring secured to said base and having a vertically movable portion engaging said setting arms, and a vertically disposed tripping plate pivotally connected at its lower end to the base, and having locking means for holding said spring and setting arms in set position, said plate having an aperture therein, and said spring having a portion projecting through said aperture to form a thumb piece for depressing the spring into set position and adapted to engage said plate in the released position of the trap to limit the rearward movement of the pan said spring having portions forward of the plate for engaging the plate to limit its forward movement.

9. In an animal trap, the combination of a base, a pair of opposed jaws pivotally mounted thereon, a setting arm for each jaw located at a distance therefrom, a flat spring having one end secured to the base, and provided adjacent to the other end with apertures for loosely engaging said setting arms, and a vertically disposed tripping plate pivotally connected with said base, and provided with means for locking said spring, setting arms and jaws in set position.

10. In an animal trap the combination of a base, a pair of opposed jaws pivotally mounted thereon, a setting arm for each jaw located at a distance therefrom, a flat spring having one end secured to the base, provided adjacent to the other end with apertures for loosely engaging said setting arms, and a vertically disposed tripping plate pivotally connected with said base, and provided with locking means for engaging said spring.

11. In an animal trap, the combination of a base, a pair of opposed jaws pivotally mounted thereon, a setting arm for each jaw located at a distance therefrom, a flat spring having one end secured to the base, and provided adjacent to the other end with a vertically movable portion extending beneath said setting arms, and a transversely disposed tripping plate pivoted to said base and having a portion to engage one of said setting arms to lock the trap in set position.

12. In an animal trap, the combination of a base, a pair of opposed jaws pivotally mounted thereon, a setting arm for each jaw located at a distance therefrom, a flat spring having one end secured to the base, and provided adjacent to the other end with a vertically movable portion extending beneath said setting arms, and a transversely disposed tripping plate pivoted to said base and having an aperture to engage a projecting portion of one of said setting arms to lock the trap in set position.

13. In an animal trap, the combination of a base, a pair of opposed jaws pivotally mounted thereon, a setting arm for each jaw located at a distance therefrom, a flat spring having one end secured to the base, and provided adjacent to the other end with a vertically movable portion extending beneath said setting arms, and a transversely disposed tripping plate pivoted to said base and having locking portions for holding said spring and setting arms in set position.

14. In an animal trap, the combination of a base, a pair of opposed, transversely movable jaws, each provided with a longitudinal pivot shaft having a setting arm at a distance from the connected jaw, a flat spring secured to said base and having a vertically movable portion extending beneath said setting arms in the set position of the trap, and a vertically disposed tripping plate pivotally connected with said base and provided with an aperture, and with locking means for holding said spring and setting arms and jaws in set position, said spring having a portion projecting through said aperture in said plate, and forming a thumb engaging portion for depressing the spring into set position, the said base having a portion extending rearwardly of the tripping plate below said thumb piece, to cooperate therewith in opening the jaws of the trap and setting the same.

15. In an animal trap, the combination of a base, a pair of opposed jaws pivotally mounted thereon, a setting arm for each jaw located at a distance therefrom, a flat spring having one end secured to the base, and provided adjacent to the other end with laterally extending upwardly bent portions having apertures therein for loosely engaging said setting arms to operate said jaws and accommodate changes of position of the setting arms, and a tripping plate pivotally secured to said base, and provided with locking means for holding said spring, setting arms and jaws in set position.

HERSHEY ROY GRAYBILL.